United States Patent [19]

David

[11] Patent Number: 4,701,314

[45] Date of Patent: Oct. 20, 1987

[54] METHOD OF PRODUCING MICROSIZED AMORPHOUS PARTICLES OF METAL PHOSPHATE

[75] Inventor: Lawrence D. David, Wappingers Falls, N.Y.

[73] Assignee: International Business Machines Corporation, Armonk, N.Y.

[21] Appl. No.: 924,703

[22] Filed: Oct. 29, 1986

[51] Int. Cl.[4] ...................... C01B 15/16; C01B 25/16
[52] U.S. Cl. .................................. 423/311; 423/305; 423/306; 423/308; 423/309
[58] Field of Search ............... 423/308, 311, 305, 307, 423/309, 306

[56] References Cited

U.S. PATENT DOCUMENTS

| | | | |
|---|---|---|---|
| 4,478,805 | 10/1984 | Langer et al. | 423/311 |
| 4,542,001 | 9/1985 | Iino et al. | 423/308 |
| 4,622,310 | 11/1986 | Iacobucci | 423/311 X |

*Primary Examiner*—Gregory A. Heller
*Attorney, Agent, or Firm*—Wolmar J. Stoffel; Ira David Blecker

[57] ABSTRACT

The process for producing microsized amorphous particles of a metal phosphate incorporates the steps of
 forming a solution of a metal alkoxide in an organic solvent,
 forming an aqueous phosphoric acid solution,
 introducing the alkoxide and the phosphoric acid solutions into a reactor vessel wherein the solutions are immiscible and forming two separate liquid phases with an interface,
 applying agitation to at least the region of the interface to promote a reaction between the metal alkoxide and said phosphoric acid at the interface,
 collecting the reaction product, and
 firing it in an oxygen containing environment at a temperature sufficiently high to drive off the organic residue.

17 Claims, No Drawings

METHOD OF PRODUCING MICROSIZED AMORPHOUS PARTICLES OF METAL PHOSPHATE

BACKGROUND OF THE INVENTION

This invention relates to methods of producing amorphous materials, more particularly to methods for producing amorphous metal phosphates having desirable particulate characteristics for applications involving interactions with metals and ceramics.

Finely divided glass powders, particularly metal phosphates, are useful in the manufacture of coating compositions, conductive metal pastes, cements, as adhesives in bonding metals to ceramics, and for fabricating multilayer ceramic substrates for semiconductor packages. A variety of techniques have been attempted for the production of inorganic powders that are characterized by particles which have fine grain and microsized dimensions. Grinding of organic powders can result in very fine particles but conchoidal fracture and other cleavage effects during grinding will yield particles with sharp edges and jagged contours.

Shock cooling, spray drying, and prilling have also been investigated for this purpose. In most cases these methods provide powder particles that have one or more undesirable physical properties such as porosity, nonuniformity of particle size and shape, lack of crystal homogeneity, and the like.

Metal phosphates are of particular interest because they can be used to bond conductive metals, such as copper, to various ceramic and glassy materials. The reason for its bonding action is that the metal phosphates are compatible with both the metal and ceramic and/or glass substrate. In general, the metal portion of the metal phosphate reacts and bonds to metal pads or metal lines on the substrate, and the phosphate portion is compatible with and reacts with ceramic and glass. Aluminum phosphate, $AlPO_4$, is particularly adapted to bond copper and glass ceramic.

The metal oxides, and more particularly, the metal phosphates, are effective for performing the bonding function when the surface area of the metal is large, and the particles are non-crystalline, i.e., amorphous in nature. In order to achieve high surface areas, the particles should be very small, on the order of less than 200 Angstroms. The particles, when amorphous, are at a higher energy state than when the particles are crystalline in nature, and are therefore more reactive.

Glassy aluminum phosphate cannot be prepared by melting a mixture of Alhd 2O3 and $P_2O_5$ since the $P_2O_5$ volatilizes from melts of aluminum phosphate. Precipitation of aluminum by phosphate in aqueous solution, yields crystalline aluminum phosphate. Glassy aluminum phosphate has been produced by Cassidy et al, Imperial Chemical Industries, in which synthesis aluminum chloride and concentrated $H_3PO_4$ are reacted in ethanol at dry ice temperatures. These efforts are set forth in SCIENTIFIC AMERICAN 248 (5), p.114 (1983). This yields a yellow powder, where the yellow color is due to iron contamination, in aluminum chloride. Chloride contaminants are also present. The powder melts to form yellow glass. The necessity of doing the synthesis far below the ambient temperature is also a gross inconvenience. The necessary addition of aluminum chloride, which reacts with the $H_3PO_4$, produces yet another corrosive gas, i.e., HCl, which outgasses on pyrolysis.

Sol-gel syntheses are typically performed in one phase. A metalorganic compound is dissolved in the solvent in which the gelling agents, usually aqueous bases or acids, are also soluble. This can yield fine particles if the gellation reaction is slow. If it is a rapid reaction, then uncontrollable particle growth may result.

DISCLOSURE OF THE INVENTION

The object of this invention is to provide a method of forming metal phosphate particles that have desirable characteristics for sintering applications.

Another object of this invention is to provide a process for forming particles of metal phosphate that are amorphous in structure and are of a microsize.

Yet another object of this invention is to provide a process for producing metal phosphate that is substantially uncontaminated.

In accordance with the aforementioned objects of the invention, amorphous metal phosphate is synthesized by the reaction of a metal alkoxide, dissolved in an organic solvent that is less dense and not miscible with water or phosphoric acid. An aqueous solution of phosphoric acid is combined with the metal alkoxide solution in a reaction vessel and the reaction run at room temperature in an inert atmosphere. Some method of agitating the organic solvent-aqueous layer interface such as, but not limited to ultrasonification, is required to induce the reaction. A white floc of microsized particles is produced. The reaction product is removed, and fired at approximately 500° C. in air to induce particle growth to an average of 150 Angstroms, and to burn off the organic residue.

DESCRIPTION OF PREFERRED EMBODIMENTS

In this process for producing microsized particles of metal phosphate, a metal alkoxide in an organic solvent, and an aqueous phosphoric acid solution are introduced into a reaction chamber and the solutions are agitated. The resultant product is removed and heated to drive off the organics and increase the particle size.

An important aspect of the method of the invention is that the reaction between the reactants necessary to produce the particle desired takes place at the interface of two immiscible solutions, each of which contains one of the reactants. The reactants are inherently supplied to the reaction zone, i.e., the interface, at a controlled rate. The reaction is accelerated by providing some form of agitation to promote mixing. Agitation is most preferably achieved with a sonic generator. It is theorized that the application of ultrasonic energy to a liquid forms cavities in the liquid that are essentially small voids which open in negative pressure regions. High level pressures result when these cavities collapse which then produce nuclei which hasten the reaction. Other suitable forms of agitation can also be used, as for example, localized stirring, boiling, and bubbling gas through the liquid.

It has been discovered that the product of the reaction formed at the interface is amorphous in nature, rather than being crystalline with a particle size that is microsize, i.e., less than 200Å.

The solvent used in the method of the invention that contains the alkoxide must be immiscible with water, having a density less than that of water, be capable of dissolving the desired alkoxide, and not be appreciably soluble in water. Typical solvents are toluene, benzene, and xylene. In general, the preferred solvent is a light hydrocarbon that will dissolve the alkoxide. Normally the concentration of the alkoxide in the solvent is on the order of 40%, but this can vary depending on the nature of the solvent and the alkoxide, and the particular application requirements.

The alkoxide used in the process of the invention has the general formula M—(OR)$_n$, where R is methyl, ethyl, n-propyl, isopropyl, n-butyl, t-butyl, isobutyl, or other organic radicals. M is a metal such as aluminum, chromium, nickel, or tin, and n is a number from 2 to 4.

Several toluene-soluble alkoxides of tin exist which are useful in the practice of the invention for producing $Sn_3(PO_4)_4$. Alkoxides of chromium and nickel with small alkyl group, such as methyl and ethyl are insoluble. However, chromium and nickel with larger alkyl groups such as tert-butyl, tert-amyl etc. are soluble in the solvents previously described and can be used to produce $CrPO_4$ and $Ni_3(PO_4)_2$. The amount of alkoxides of the metal chosen must be adjusted in accordance with the respective valence of the metal.

The acid reactant can be any acid material that will react with the metal contained in the alkoxide to form an amorphous glass-like material. The preferred acid is phosphoric acid, dissolved in water in the range of 0.1 to 35% by weight, more preferably in the range of 0.3 to 10% by weight.

The temperature of the reactant solutions can be any temperature that permits the reaction to proceed at a practical rate. Preferably, the temperature of the reaction is above 0° C, the freezing point of water, to 50° C.

The overall reaction to form a metal phosphate is the product of at least two reactions. It is theorized that the initial hydrolysis reaction that occurs at the interface of the organic and aqueous solutions is as follows:

$$M(OR)_n + nH_2O \rightarrow M(OH)_n + nROH$$

The metal alkoxide is converted into a metal hydroxide and an alcohol. The metal hydroxide subsequently reacts with phosphoric acid to form a metal phosphate and water. The rate of reaction at the interface of the solution is controllable because of the limited contact between the reactants, i.e., by the interface. A further rate of reaction control is the aforementioned hydrolysis of the alkoxide. Hydrolysis splits the alkoxide into reactants which will in turn react to form the metal phosphate. Hydrolysis is the intermediate and rate-controlling reaction for the formation of a metal phosphate since the reaction of the metal hydroxide with phosphoric acid to form metal phosphate is very fast and therefore controlled by the supply of reactants.

The metal phosphate precipitates out in the aqueous phase as an amorphous powder with particles of a size less than 200 Angstroms. This product is separated from the aqueous solution, dried, and calcined in air or oxygen, preferably at a temperature of the order of 500° C. The calcining operation drives off any residual organic materials.

Another possible and plausible reaction path would be the direct interaction of $H_3PO_4$ with the alkoxide:

$$Al(OR)_3 + H_3PO_4 \rightarrow 3ROH + AlPO_4$$

This would not involve any hydroxide intermediate, but a reaction of the metal-bearing species with phosphate ions:

$$Al(OR)_3 + H_3PO_4 \rightarrow Al(OR)_2(ROH)^+ + H_2PO_4^-$$

$$Al(OR)_2(ROH)^+ + H_2PO_4^- \rightarrow (HO)_2\overset{O}{\underset{\|}{P}}-O-Al(OR)_2 + ROH$$

$$H^+ + (HO)_2\overset{O}{\underset{\|}{P}}-O-Al(OR)_2 \rightarrow (HO)_2\overset{O}{\underset{\|}{P}}-O-Al(OR)(ROH)^+$$

$$(HO)_2\overset{O}{\underset{\|}{P}}-O-Al(OR)(ROH)^+ \xrightarrow{\text{(several steps)}} AlPO_4 + 3 ROH$$

The following Examples are included to illustrate preferred modes of practicing the invention and should not be construed to unduly limit the scope of the claims.

EXAMPLE I 200 ml $Al(OC_4H_9)_3$ (95%, Alfa Ventron), containing 0.746 mole equivalents of aluminum was dissolved in 800 ml of toluene. 51 ml of 85% $H_3PO_4$ is diluted to one liter with distilled water to make a 0.746 M $H_3PO_4$ solution. This solution was placed in a three-liter round-bottom flask, immersed in an ultrasonic bath, and fitted with an addition funnel and a condenser. A layer of toluene was placed on the $H_3PO_4$ aqueous layer. The $Al(OC_4H_9)_3$—toluene solution was charged to the addition funnel. The ultrasonic bath was turned on and the solution added dropwise to the reactor. A fine white floc slowly formed which sank into the aqueous layer. The reaction was substantially complete in one hour after the dropwise addition was completed, at which time the sonification was turned off, the liquid phase filtered off, and the powder dried. This powder was amorphous and contained equimolar amounts of aluminum and phosphorous as demonstrated by an ICAP analysis. Approximately one-third of the powder weight was organic material. This powder was calcined for 8 hours in air at 500° C. to burn off the organic residue. The firing step increased the average particle size from 100 Angstroms to about 150 Angstroms, and broadened the size distribution. Voids appeared in the particles probably due to volatilized organics and combustion products. The elemental analysis of the fired powder was

|  | Weight % Al | % P |
| --- | --- | --- |
| Theoretical AlPO$_4$ | 22.1 | 25.4 |
| Found | 20.6 ± 0.2 | 26.9 ± 0.3 |

This demonstrated that there was no loss of $P_2O_5$ on firing. The powder was amorphous and was examined on an x-ray diffractometer. SEM/TEM revealed small crystals dispersed here and there in the amorphous matrix. These crystals were identified as an odd phase of AlPO$_4$, which becomes amorphous on bombardment by the electron beam. Typical yield of this reaction was 93%. The calcined powder was white and carbon free because the starting materials contained no iron or chlorine. The product is superior in purity to aluminum phosphate produced by the reaction of aluminum chloride and phosphoric acid.

EXAMPLE 2

Using the same basic procedure described in Example I, 177.52 g or 0.500 mole of $Sn(O^iC_3H_7)_4$ is dissolved in 800 ml of toluene. This solution is introduced into a reaction vessel and 45.6 ml of 85% $H_3PO_4$ in a liter of distilled water is added dropwise to the solution. Again a fine floc is slowly formed in the aqueous layer. The yield of $Sn_3(PO_4)_4$ is 110.0 grams or 89.7% of the theoretical.

EXAMPLE 3

Using the same basic procedure described in Example I, 156.7 grams or 0.5 mole, of chromium tert-amyloxide $(Cr(OC_5H_{11})_3)$ is used as the chromium source. 34.2 ml (0.500 mole) of 85% $H_3PO_4$ is used to make the aqueous solution. The yield of $CrPO_4$ is 68.3 grams or 92.9% of the theoretical.

EXAMPLE 4

Using the same procedure described in Example I, 116.5 grams (0.500 mole) of nickel tert-amyloxide, $Ni(OC_5H_{11})_2$, is used as the nickel source. 22.8 ml (0.333 mole) of 85% $H_3PO_4$ is used to make the aqueous solution. The yield of $Ni_3(PO_4)_2$ is 55.8 grams, or 91.5% of the theoretical.

While the present invention has been particularly shown and described with reference to the preferred embodiments therefore, it will be understood by those skilled in the art that the foregoing and other changes in form and detail may be made therein without departing from the spirit and scope of the present invention.

I claim:

1. A process for producing microsized amorphous particles of a metal phosphate comprising,
    forming a solution of a metal alkoxide in an organic solvent, said organic solvent being immiscible with water, having a density less than that of water,
    forming an aqueous phosphoric acid solution,
    introducing said metal alkoxide solution and said phosphoric acid solution into a reaction vessel, said solutions being immiscible and forming two separate liquid phases with an interface,
    applying agitation to at least the region of the interface to promote a controlled reaction between said metal alkoxide and said phosphoric acid at said interface,
    collecting the reaction product of said metal alkoxide and phosphoric acid,
    firing said reaction product in an oxygen-containing environment at a temperature sufficiently high to drive off the organic residue in said reaction product, wherein the metal of said metal alkoxide is a metal selected from the group consisting of Al, Cr, Ni and Sn, and mixtures thereof.

2. The process of claim 1 wherein said metal alkoxide has the general formula $M(OR)_n$ where M is a metal selected from the group consisting of Al, Cr, Ni and Sn, and R is an organic radical selected from the group consisting of methyl, ethyl, n-propyl, isopropyl, n-butyl, t-butyl, and isobutyl, isoamyl, t-amyl, O is oxygen, and n is a number from 1 to 4.

3. The process of claim 1 wherein said metal alkoxide is $Al(OC_4H_9)_3$.

4. The process of claim 1 wherein said organic solvent is an organic liquid selected from the group consisting of toluene, benzene, and xylene.

5. The process of claim 1 wherein the concentration of metal alkoxide in solvent is in the range of 1 to 45% by weight.

6. The process of claim 3 wherein the concentration of $Al(OC_4H_9)_3$ in the solvent is in the range of 1 to 45% by weight.

7. The process of claim 1 wherein the concentration of phosphoric acid in water is in the range of 0.1 to 35% by weight.

8. The process of claim 7 wherein the concentration of phosphoric acid in water is in the range of 0.3 to 10% by weight.

9. The process of claim 1 wherein said agitation is achieved with a sonic generator.

10. The process of claim 2 wherein said agitation is achieved by applying ultrasonic energy to the solutions contained in said reaction vessel.

11. The process of claim 2 wherein said metal is Al.

12. The process of claim 2 wherein said metal is Cr.

13. The process of claim 2 wherein said metal is Ni.

14. The process of claim 2 wherein said metal is Sn.

15. The process of claim 11 wherein the group consisting of organic radical of said metal alkoxide is selected from n-butyl, t-butyl and i-butyl.

16. The process of claim 12 wherein said organic radical of said metal alkoxide is tert-butyl or tert-amyl groups.

17. The process of claim 13 wherein said organic radical of said metal alkoxide is tert-butyl or tert-amyl groups.

* * * * *